D. MAGGIORA.
MEANS FOR SECURING TIRES TO RIMS OF VEHICLES.
APPLICATION FILED DEC. 14, 1920.
1,429,152. Patented Sept. 12, 1922.
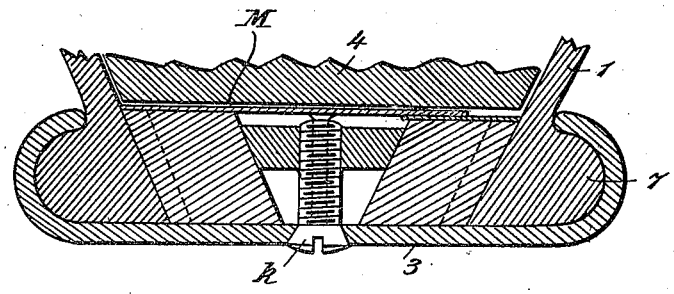
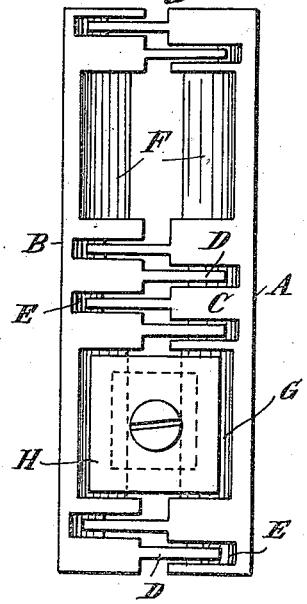
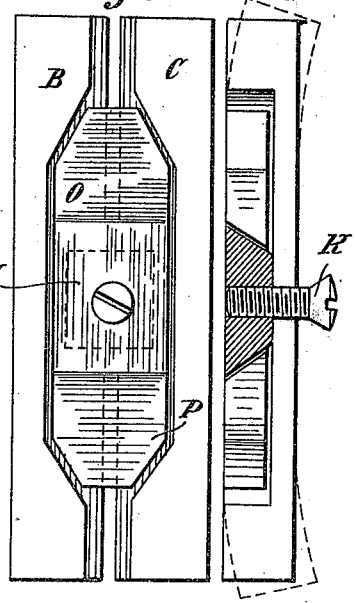
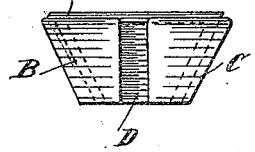
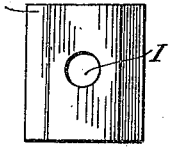
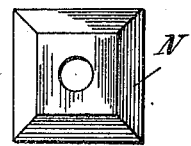
INVENTOR
DEMETRIO MAGGIORA
BY
ATTORNEYS Patented Sept. 12, 1922.

1,429,152

UNITED STATES PATENT OFFICE.

DEMETRIO MAGGIORA, OF FLORENCE, ITALY.

MEANS FOR SECURING TIRES TO RIMS OF VEHICLES.

Application filed December 14, 1920. Serial No. 430,620.

*To all whom it may concern:*

Be it known that I, DEMETRIO MAGGIORA, a subject of the King of Italy, and residing at Florence, Italy (whose postal address is Viale Le Fontanelle, Trespiano, Florence, Italy), have invented certain new and useful Improvements in Means for Securing Tires to Rims of Vehicles, of which the following is a specification.

My present invention refers to a means for securing tires to rims of vehicle wheels. As stated in other patent applications the solid tires consist of the usual outer tire, such as those used with pneumatic tires in the inside of which tire instead of the air chamber are arranged one or more cylindrical elements formed of several concentric india-rubber parts having their molecules in an abnormal condition of equilibrium, the said elements constituting a source of elasticity in potential condition, ready to react against the effect of outside forces.

It is easily understood that owing to the construction of the inside elements when the tire is mounted with its edges in the rim it is necessary to have a device for keeping the edges against the sides of the rim.

Such device must also allow the sides of the rim during the mounting to approach each other. This of course, is only necessary for rims in one piece, because for rims made of two parts in the forms of rings the fixing and tightening of the edges of the tire can be effected by pressing more or less against each other the two halves which constitute the rim.

The means of fixing which forms the object of my application, consists in the provision of metallic segments arranged between the edges of the tire, said segments being enlarged so as to bring and maintain the edges in working position.

My inventon is illustrated in the annexed drawings in which

Figure 1 is a section of the rim with the fixing device and part of the tire.

Figure 2 shows on a reduced scale a plan view of the device.

Figure 3 is a front view of same.

Figure 4 is the block for opening the two parts of the device.

Figures 5 and 6 are respectively plan and side view of another form of the device.

Figure 7 shows the block used for the device illustrated in Figures 5 and 6.

With reference to Figure 1, 1 is the tire, 3 the rim, 4 the rigid or semi-rigid part of the support fast to the inner elastic element, and 7 are the edges of the tire.

When the edges 7 have been inserted in the rim, they must be kept firm in the position shown.

This is obtained by arranging, a certain number of circular metallic segments A which when assembled together form a segmented ring which completely uncircles the rim 3. One of those segments is shown in Figure 2. It consists of two equal and symmetrical parts B and C, respectively provided with the projections and cavities D and E which, engaging with each other, serve to keep the two parts in reciprocal alignment, while they can approach or move away from each other. The two parts B and C have two cavities F G with inclined walls in which enters a square metallic block H, with inclined faces as shown in Figure 4. Block H is based at 1, the bore being screw-threaded to receive a screw K. The screw passes through a hole in the rim 3, against which it stops with its head. When the tire has been mounted the screws K of the various segments are tightened thus producing a traction on blocks H, which with their inclined faces in contact with the inclined walls of cavities F and G, in descending the two parts B and C away from each other so that they press against the tire fixing its edges within the curved sides of the rim. The upper face of the segment is covered by a plate M which constitutes the supporting surface for the part which constitutes the support of the inside elastic element.

Figures 5 and 6 show another form of the invention in which instead of two blocks N one single central block N is used.

In this case in order to distribute the action of block N over the entire or nearly the entire length of the segment said block has four inclined faces two of which co-operate with the inclined walls of the central cavity formed in the two parts B and C and the other two faces co-operate with the inclined faces of two wedges O and P which enter between the inclined faces formed near the ends of parts B and C of the segment.

By operating the screw K, the two parts B and C are separated as in the first case; with this construction less screws are required.

The rim may be used as one of the usual detachable rims or it may be fixed to the hub of the wheel, in which case the screws K must pass through the hub.

Having now particularly described and ascertained the nature of my said invention and in what manner the same is to be performed, I declare that what I claim is:—

1. In means for securing solid tires to the rims of vehicle wheels, the combination with a rim and a tire, of a ring arranged on the rim between the edges of the tire, said ring being formed of circular segments, each formed of two parts, substantially as set forth.

2. In means for securing solid tires to the rims of vehicle wheels as claimed in claim 1, segments consisting of two parts connected together by cavities and projections, the said parts being provided with inner inclined faces or walls against which co-operate inclined faces of a block, the action of said block being controlled from the outside of the rim by means of a screw screwed in the block substantially as and for the purpose set forth.

3. In means for securing solid tires to the rims of vehicle wheels as claimed in claim 1, wherein inclined faces of the two parts, which constitute the segment are adapted to press against the inner sides of the tire for pressing and maintaining the edges of said tire within the curved sides of the rim, after the tire has been mounted, each segment being provided with a flat or curved surface on which is fitted the support of the inner elastic element, the two parts of the segment being closed together by blocks and wedges, the movement of which is controlled from outside of the rim by means of screws, the heads of which co-operate with the rim and are screwed in the blocks, the whole substantially as and for the purposes set forth with reference to the annexed drawings.

In testimony whereof I have hereunto signed my name in the presence of two witnesses.

DEMETRIO MAGGIORA.

Witnesses:
TOVINNELO TIETZ,
ISABELLE KIRCH.